UNITED STATES PATENT OFFICE.

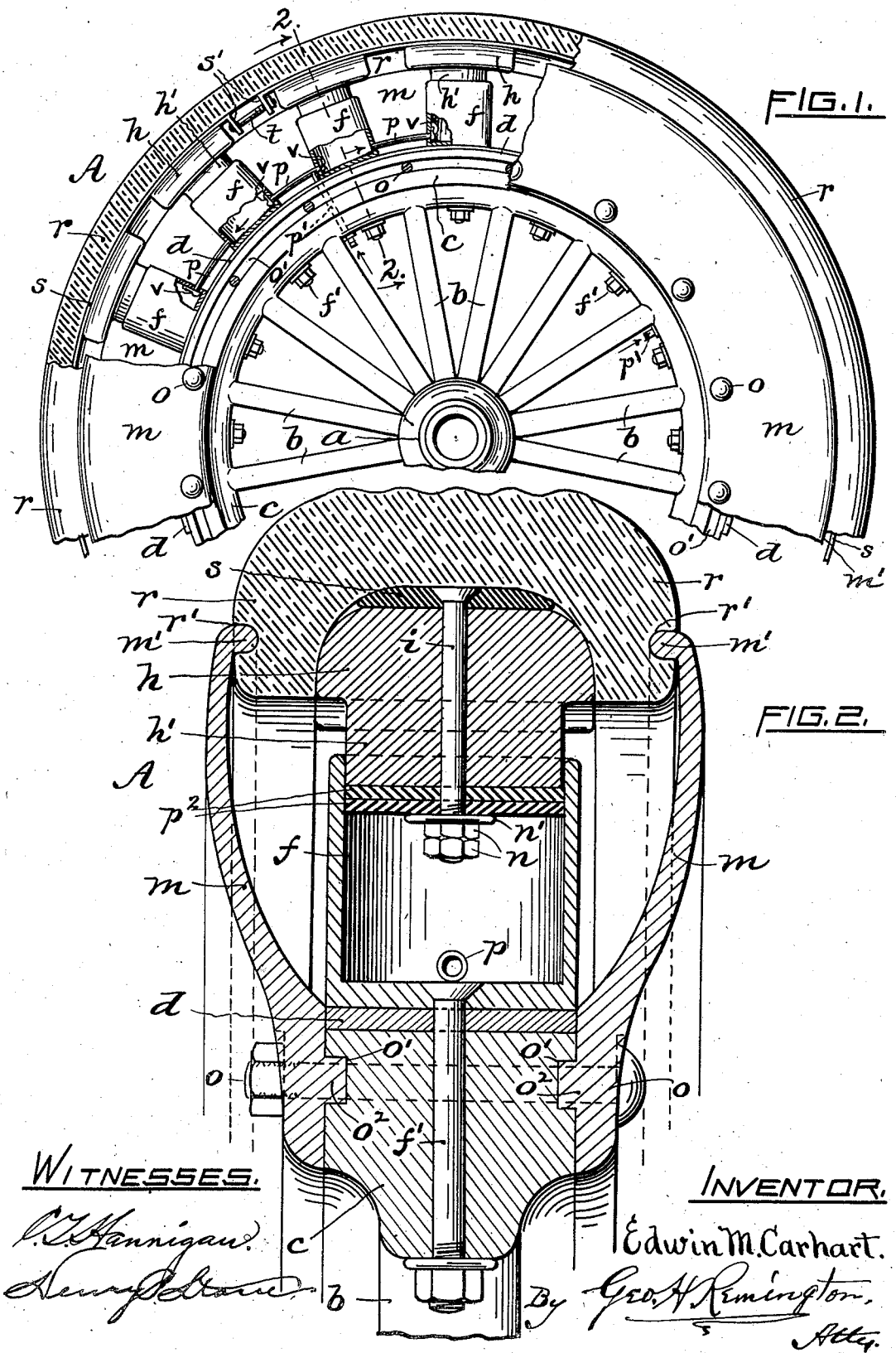

EDWIN M. CARHART, OF PROVIDENCE, RHODE ISLAND.

RESILIENT-TIRED WHEEL FOR SELF-PROPELLED VEHICLES.

No. 872,645.   Specification of Letters Patent.   Patented Dec. 3, 1907.

Application filed February 16, 1907. Serial No. 357,625.

*To all whom it may concern:*

Be it known that I, EDWIN M. CARHART, a citizen of the United States of America, and a resident of Providence, in the county of Providence and State of Rhode Island, have invented certain new and useful Improvements in Resilient-Tired Wheels for Self-Propelled Vehicles, of which the following is a specification.

My invention relates in general to improvements in the construction of resilient or cushion-tired wheels of the class more especially adapted for use on self-propelled or motor-vehicles.

The specific features of this invention, however, relate to novel improvements in the tire and rim portions of the wheel; and it consists, essentially, in the combination with the suitably constructed and supported non-yielding rim member proper, and the non-pneumatic annular traction-tire of rubber materially larger and normally concentric therewith, of a plurality of shallow air-tight cups or cylinders spaced around, secured to and extending radially from the rim, connected piston or plunger-blocks movably mounted in said cylinders and in continuous contact with the inner or concave face of said tire member, a pair of oppositely disposed annular side plates of metal rigidly secured to said rim and tire members, and means connected with the cylinders through which the latter are charged with air under pressure, all as more fully hereinafter set forth and claimed.

In the accompanying sheet of drawings, Figure 1 represents a partial front side elevation of a motor-vehicle wheel embodying my improvements; a portion of the side plate and rubber tire members being broken away to show the interior construction and arrangement of the several parts, and Fig. 2 represents, in enlarged scale, a cross-sectional view of the rim, &c., taken on line 2 2 of Fig. 1.

In the resilient-tired wheel A, embodying my improvements, the hub $a$, spokes $b$ and rim or felly $c$ are or may be constructed substantially as usual. I prefer to make the outer face of said rim member true and cylindrical, its two sides being flat and parallel and provided with the oppositely disposed concentric grooves $o^1$. To the outer face of the rim is fitted and rigidly secured a thin hoop or band $d$ of metal. At evenly spaced distances around the said metal-faced rim are located shallow cups or cylinders $f$; these extend outwardly in a radial direction, each as drawn being secured in place by a central radial bolt $f^1$ passing through the base of the cylinder, band $d$ and the rim $c$, a nut on its inner or lower end firmly holding the cylinder in position, all as clearly represented.

As drawn, see Fig. 1, the cylinders are arranged in four series of four each. The cylinders of each series are connected at a point near the lower ends by short interposed tubes $p$, the middle tube being in continuous open communication with the branch tube $p^1$ extending downwardly or inwardly through the said band and rim members and being suitably tipped and adapted to be attached to an air or charging-pump in a well-known manner. The discharge orifices of the tubes $p$ in each cylinder may be provided with an air-valve, as indicated at $v$. By this arrangement the four cylinders are adapted to be simultaneously charged with air under pressure.

Each cylinder is provided with a plunger-block, preferably made of wood; its head portion $h$ being elongated circumferentially, curved transversely and provided on its inner side with a central piston or plunger $h^1$ movably mounted in the cylinder and faced with suitable packing members $p^2$ of leather or other pliable material, thereby when in use forming an air-tight joint to prevent the escape of air confined under pressure in the cylinder chamber.

A comparatively narrow and somewhat flexible thin band $s$ of steel encircles the plunger-blocks, each of the latter being secured to it by means of the radial bolt $i$ passing centrally through it and the plunger and the packing members $p^2$; a washer $n^1$ and nuts $n$ firmly holding the several members together, see Fig. 2. I prefer to bend the two ends of said steel band downwardly, thereby forming longitudinally separated ears $s^1$ through which a take-up or adjusting bolt $t$ extends, as indicated in Fig. 1. This device is also employed in assembling and positioning the parts.

The endless traction or outer solid tire $r$, of rubber, may have any suitable form cross-sectionally. In the drawings it is represented as having a shallow substantially U-shape or concavo-convex form, its inner or concave face conforming to the adjacent outer cross-sectional form of the plunger-block's head $h$ and its superposed band $s$, and also being in continuous snug contact therewith. On the opposite outer downwardly extending integral sides or flanges of the tire member $r$ and near its lower edges are formed the concentric circular grooves $r^1$, arranged to receive therein the corresponding inwardly facing circular ribs $m^1$ of the annular plates or cheeks $m$, about to be described. The said plates $m$ are made of metal, each having a slightly curved and graceful form cross-sectionally, and gradually increasing in thickness toward its inner portion or base. The said base part of each plate is turned or faced off true and provided with the circularly arranged lip or rib $o^2$ fitting the said recess $o^1$ of the rim $c$. At suitable intervals, circumferentially, bolts $o$ are inserted transversely through the base portion of the plates and the adjacent part of the rim, thereby rigidly securing said tire $r$ and side plates to the non-yielding rim $c$.

In my improved wheel A all the parts or elements extending radially beyond the spokes and which are subjected to wear, excepting the outer or traction face of the rubber tire member $r$, are thoroughly protected and dust-proof; it is simple in construction and action and not liable to get out of order; all the parts are readily accessible, after the removal of one of the side plates $m$; the relative distance between the rim $c$ and the grooved lower side flanges of the rubber tire member is maintained at all times by means of the non-yielding side plates $m$, which practically interlock therewith; the intermediate portion of the rubber tire member is, however, capable of being depressed a distance corresponding with the load upon the axle of the wheel and the degree of air pressure confined in the cylinders $f$ and bearing against the pistons of the interposed plunger-block members, the maximum movement of such cushioning effect being attained when the plunger-heads contact with the outer or upper ends of the respective cylinders.

I am aware that resilient wheel-tires have been devised which include in their construction a plurality of radially mounted peripherally disposed cylinders provided with movable air-resisted pistons in contact with a corresponding number of tire sections capable of independent movement toward or from the center of the wheel, and in which more or less of the working parts are unprotected or exposed. In my improved tire device the endless rubber tire member $r$ and the inelastic wheel-rim $c$ are kept in position with respect to each other both circumferentially and laterally by the two imperforate annular outer side plates $m$ $m$ rigidly secured to said members, thereby forming an air, water and dust-tight annular space or chamber in which the working parts are located.

I claim as my invention and desire to secure by United States Letters Patent:—

1. In a wheel of the character described, the combination with the rim $c$, a pair of oppositely disposed annular metal plates $m$ rigidly secured to the front and rear sides of the rim, and a continuous annular rubber tire member $r$ having a substantially concavo-convex form cross-sectionally seated in and being supported by said plates, of a plurality of short radially extending air-tight cylinders arranged around and rigidly secured to said rim member, a suitably packed piston or plunger-block $h$ $h^1$ movably mounted in each cylinder, its upper or head portion being enlarged and fitted to the adjacent concave part of the tire $r$, and a continuous hoop or band $s$ of metal extending circumferentially around and being secured to the heads of the pistons, all constructed, arranged, and adapted for operation substantially as hereinbefore described.

2. In a wheel of the character described, the combination of the rim member $c$, a plurality of radially arranged independent air-tight cylinders secured to the rim by bolts passing through the latter and the bottom of the cylinders, a non-pneumatic annular tire of rubber having its inner peripheral surface provided with a continuous groove or recess, a packed piston or plunger-block movably mounted in each cylinder and being in continuous yielding contact with said grooved portion of the tire, and a pair of laterally separated removable non-yielding outer side plates $m$ $m$ secured to said rim and tire for supporting and maintaining the latter member in the normal position.

Signed at New Haven, Conn. this 9th day of February, 1907.

EDWIN M. CARHART.

Witnesses:
HARRISON HEWITT,
JOHN BASSIMIER.